3,162,509
PROCESS FOR PREPARATION OF SULFUR-CONTAINING COMPOUNDS OF PLUTONIUM

Norman R. Davidson, Sierra Madre, Calif., assignor to the United States of America as represented by the United States Atomic Energy Commission
No Drawing. Filed Sept. 2, 1947, Ser. No. 771,700
1 Claim. (Cl. 23—14.5)

This invention relates to sulfur-containing compounds of plutonium and a process for their preparation.

It is an object of this invention to provide new compounds of plutonium.

Another object of this invention is to provide a process for the preparation of sulfur-containing compounds of plutonium.

I have found that sulfur-containing compounds of plutonium, specifically diplutonium dioxysulfide and diplutonium trisulfide, can be prepared by contacting a plutonium compound of the group consisting of oxides, hydroxides, carbonates, and nitrates and mixtures thereof with a sulfiding agent at an elevated temperature, preferably in the presence of graphite. The sulfiding agent is selected from the group consisting of hydrogen sulfide, carbon disulfide, and sulfur and mixtures thereof. The temperature of the reaction is suitably maintained between 700 and 2000° C. Suitable plutonium compounds include plutonium dioxide ($PuO_2$), plutonium hydroxide ($Pu(OH)_4$), plutonium carbonate ($Pu(CO_3)_2$), plutonium nitrate ($Pu(NO_3)_4$), and plutonyl nitrate ($PuO_2(NO_3)_2$). The preferred plutonium compound is plutonium dioxide.

In one embodiment of the invention the contacting at elevated temperature is carried out for a short period of time in order to prepare as the sulfur-containing compound of plutonium the diplutonium dioxysulfide. The contact time varies inversely with the temperature. At a temperature of 1200 to 1400° C., a suitable period of time is 0.3 to 1 hour for a high yield of the desirable diplutonium dioxysulfide from plutonium dioxide. Using a shorter contact time a lower yield of diplutonium dioxysulfide is obtained.

The amount of sulfiding agent used is preferably at least the stoichiometric amount and to insure a high degree of conversion a considerable excess of sulfiding agent is used. When mixtures of sulfiding agents are used the ratio of the agents can be varied broadly. Hydrogen sulfide is preferred.

In a second embodiment of the present invention diplutonium trisulfide is prepared by contacting a plutonium compound of the group consisting of oxides, hydroxides, carbonates, and nitrates and mixtures thereof with the sulfiding agent of the invention at an elevated temperature, preferably between 700 and 2000° C., to form diplutonium dioxysulfide, and it is contacted with either the same or a different sulfiding agent of this invention at an elevated temperature, preferably between 700 and 2000° C. Thus, diplutonium trisulfide is prepared by contacting a plutonium compound of the group consisting of oxides, hydroxides, carbonates, and nitrates and mixtures thereof with a sulfiding agent at an elevated temperature and for a prolonged period of time, for example, at least 1.5 hours. Greater than the stoichiometric amount of sulfiding agent is preferably used and the preferred agent is hydrogen sulfide. A suitable contact time using plutonium dioxide is two hours when the temperature is 1400° C.

In a third embodiment diplutonium trisulfide is prepared by contacting diplutonium dioxysulfide at an elevated temperature, preferably between 700 and 2000° C., with a sulfiding agent of the group described above.

The products of this invention, namely diplutonium dioxysulfide and diplutonium trisulfide are useful as refractory materials. These sulfides of the $Pu^{239}$ isotope are useful in breeder piles or high temperature piles for the production of power since $Pu^{239}$ is fissionable.

The following examples illustrate these embodiments of the invention.

Example I

A pellet of oven-dried plutonium hydroxide $$(PuO_2.xH_2O)$$

weighing 3.5 mg. was placed in a graphite crucible consisting of a piece of cylindrical stock 0.5″ in diameter, 0.75″ long with a hole 0.125″ in diameter and 0.25″ deep. This crucible was suspended by a carbon rod in a vertical reactor, jacketed for water cooling, and provided with inlet and outlet lines and with an induction heating coil around the reactor at the same level as the graphite crucible. Hydrogen sulfide from a cylinder was dried by passing through a column of $P_2O_5$ and then passed into the reactor at a flow rate of about 10 cc. per minute. As the graphite crucible became hot the reactor filled with a smoke of sulfur particles from the decomposition of hydrogen sulfide. The solid sulfur was deposited on the walls of the reactor. The temperature in the reactor was raised to about 1300° C. and these conditions were maintained for about 0.75 hour. Although the pellet retained its original shape, it had a metallic luster. It was hard and difficult to powder. The powdered material was slaty black in appearance and was identified by its X-ray diffraction pattern as containing 30% $PuO_2$ and 70% of a new compound, identified by its X-ray diffraction pattern as diplutonium dioxysulfide ($Pu_2O_2S$). The diplutonium dioxysulfide was hexagonal with each unit cell containing 1 molecule, and isomorphous with dicerium dioxysulfide ($Ce_2O_2S$). The lattice dimensions were:

$$a_1 = 3.919 \pm 0.003 \text{ A.}$$
$$a_3 = 6.755 \pm 0.010 \text{ A.}$$

The calculated density was $\rho = 9.95$. Each plutonium atom was bonded to 3 sulfur atoms and to 4 oxygen atoms and the fourth oxygen atom was farther from plutonium than the other 3 oxygen atoms. Interatomic distances were Pu—S=2.94 A., Pu—O=2.33 A. for 3 oxygen atoms and 2.35 A. for the fourth oxygen atom.

Example II

Using the reactor and graphite crucible of Example I, 3.5 mg. of oven-dried plutonium hydroxide was slowly heated to a temperature of about 1400° C. and maintained at this temperature for two hours with a hydrogen sulfide flow rate of about 10 cc. per minute. The resultant metallic-appearing pellet powdered readily to a black shiny material which was identified by its X-ray diffraction pattern as diplutonium trisulfide, isomorphous with dicerium trisulfide. The crystal structure was cubic with a body-centered translation lattice. The lattice constant was:

$$a = 8.4373 \pm 0.0005 \text{ A.}$$

There were 10⅔ plutonium atoms and 16 sulfur atoms per unit cell. Each plutonium atom was bonded to 6 sulfur atoms. The interatomic distance was Pu—S=2.92 A. The calculated density was $\rho = 8.41$.

Example III

A quartz vertical reactor was loaded in a dry box with a quartz crucible containing about 5 mg. of plutonium trichloride. The reactor was so designed that when it was heated, while hydrogen sulfide was passed through it, the sulfur from the thermal decomposition of the hydrogen sulfide collected in a separate compartment and did not run back to contaminate the plutonium compound. The hydrogen sulfide used was the middle fraction from a vacuum distillation of tank hydrogen sulfide. The hydrogen sulfide flow rate through the reactor was regulated by allowing it to evaporate at its boiling point ($-59.6°$ C.) from a frozen chloroform bath (melting point of $-63.5°$ C.) by adjusting the depth of immersion of the liquid hydrogen sulfide in the bath. Hydrogen sulfide was passed over the plutonium compound in the quartz crucible, maintained at 840° C. for one hour and 916° C. for one hour. The resultant product was black with a deep purple tinge and it was identified by chemical analysis as diplutonium trisulfide ($Pu_2S_3$).

The process of preparing diplutonium trisulfide by contacting at an elevated temperature a plutonium halide with hydrogen sulfide, carbon disulfide, sulfur or mixtures thereof is claimed in my copending divisional application Serial No. 788,091, filed November 25, 1947, and entitled "A Process for the Preparation of Diplutonium Trisulfide."

Although the examples have described experiments that were carried out on a small scale, it is to be understood that the process of the present invention is suitably carried out on a large scale and that the necessary equipment would be apparent to those skilled in the art.

While preferred embodiments of the present invention are described above, other modifications may be made without departing from the spirit and scope of the invention. Thus, this invention is not to be limited to the examples but it is to be limited only by the appended claim.

What is claimed is:

A process for the preparation of a sulfur-containing compound of plutonium which comprises contacting plutonium dioxide with hydrogen sulfide in the presence of graphite at an elevated temperature.

References Cited by the Examiner

Friend: Textbook of Inorganic Chemistry, vol. 7, part 3, page 315 (1926).

Friend: Textbook of Inorganic Chemistry, vol. 7, part 3, pages 313–314 (1926), published by Charles Griffin and Co., Ltd. London.

Seaborg: Chemical and Engineering News, vol. 23, pages 2190–2192 (1945).

Fried et al.: The Basic Dry Chemistry of Neptunium, U.S. Atomic Energy Commission document MDDC–1332, declassified July 1947. Technical Information Division, Oak Ridge, Tenn.

CARL D. QUARFORTH, *Primary Examiner.*

ARTHUR W. CROCKER, JAMES L. BREWRINK, WILLIAM G. WILES, *Examiners.*